Dec. 8, 1936.  S. RUBEN  2,063,340
CONTINUOUS TORQUE IMPULSE MOTOR
Filed July 17, 1935  2 Sheets-Sheet 2
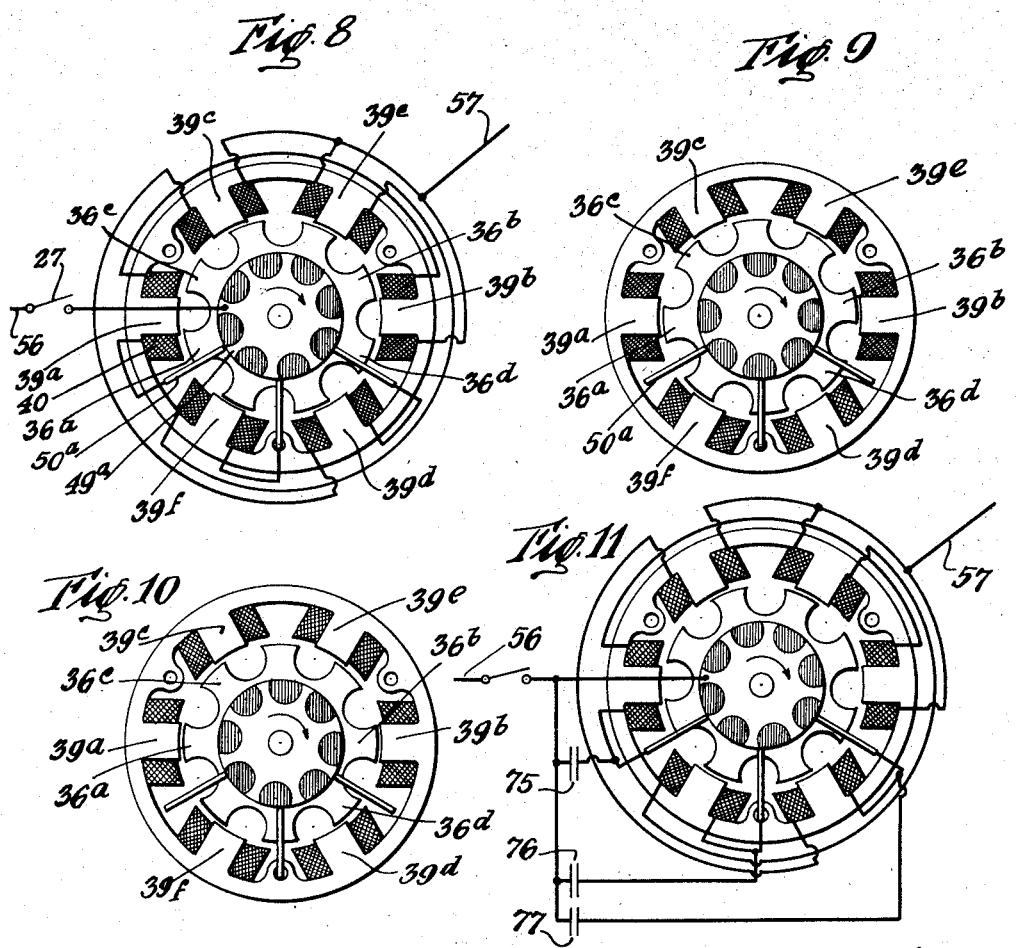
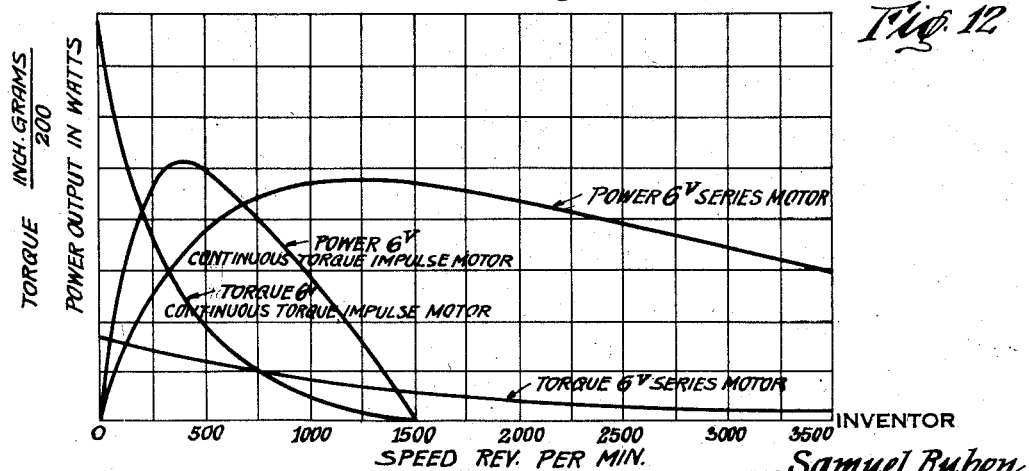
INVENTOR
BY Samuel Ruben
ATTORNEY Patented Dec. 8, 1936

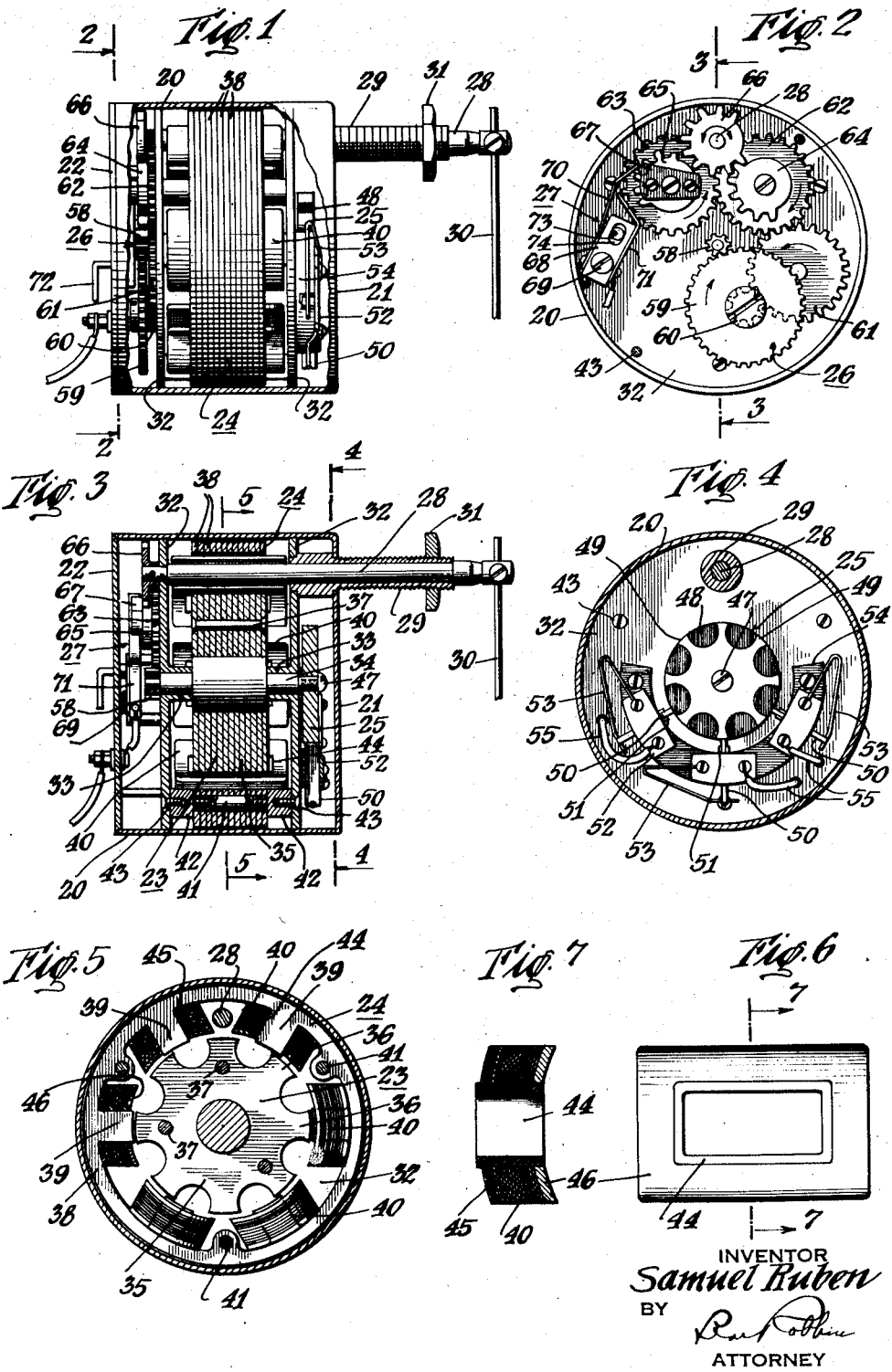

2,063,340

UNITED STATES PATENT OFFICE 2,063,340

CONTINUOUS TORQUE IMPULSE MOTOR

Samuel Ruben, New Rochelle, N. Y.

Application July 17, 1935, Serial No. 31,819

15 Claims. (Cl. 172—36)

This invention relates to electric motors.

The present application comprises a continuation in part of my copending application, Serial Number 671,430, filed May 17, 1933, for Electric motors.

An object of the invention is to produce a multi-pole impulse-type motor capable of delivering continuous and substantially uniform torque to the rotor.

Another object is to provide an electric motor of low cost and high efficiency.

A further object is to eliminate noise, vibration and bearing wear in an electric motor.

A still further object is to prevent sparking at the brush contacts of an electric motor.

Another object is to convert constant rotary motion into oscillatory rotary motion of uniform torque and speed throughout both parts of the oscillation.

A more specific object is to produce an improved windshield wiper motor.

Another specific object is to provide a reciprocating drive arrangement suitable for operating a wiper arm.

An additional object is to provide for the stopping of the electric motor when the windshield wiper arm is in a predetermined position.

Other objects of the invention will be apparent from the following description and accompanying drawings taken in connection with the appended claims.

The invention may be embodied in both D. C. and A. C. electric motors. A form which has been found suitable for the operation of automobile windshield wipers comprises a D. C. motor of comparatively small size incorporating an electric control switch and a reciprocating gear train for actuating the wiper arm.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 1 is a side elevation, with parts broken away, of the motor and windshield wiper arm;

Figure 2 is an end section, on the line 2—2 of Figure 1, showing the reciprocating gear and control switch arrangements;

Figure 3 is a vertical section through the motor on the line 3—3 of Figure 2;

Figure 4 is an end section, on the line 4—4 of Figure 3, showing the rotary contactor and brush arrangement;

Figure 5 is a section on the line 5—5 of Figure 3, showing the arrangement of the field windings in relation to the rotor;

Figures 6 and 7 are detail end and cross sectional views, respectively, of one of the field windings;

Figures 8, 9, and 10 are diagrammatic views representing various positions of the rotor and the rotary contactor;

Figure 11 is a diagrammatic view representing a modification particularly suited for A. C. operation; and Figure 12 is a graph showing characteristic power and torque curves for the motor herein described compared with those of a series motor.

Like reference characters denote like parts in the several figures of the drawings.

While a preferred embodiment of the invention is described herein, it is contemplated that considerable variation may be made in the method of procedure and the construction of parts without departing from the spirit of the invention.

In the following description and in the claims, parts will be identified by specific names for convenience, but they are intended to be as generic in their application to similar parts as the art will permit.

Referring to the drawings, the motor, in the embodiment shown, comprises a cylindrical metal case 20 having an integral end wall 21 and provided with a removable cover plate 22 over its opposite end. The operating parts of the motor, including the rotor 23, stator 24, rotary contactor 25, gear train 26 and control switch 27, are all included within the case 20.

The wiper arm drive shaft 28 extends through the end 21 of the case 20, a suitable bushing 29 being provided for this shaft. The wiper arm 30 may be secured to the end of shaft 28 in any convenient manner, such as those commonly resorted to in the prior art. The bushing 29 may be threaded and provided with a nut 31 for clamping the motor and wiper assembly to an automobile windshield frame or the like.

The iron or magnetically permeable parts of the motor (see particularly Figures 1, 3, and 5), namely the rotor 23 and stator 24 are supported within the case 20 by a pair of circular plates 32 each provided with central bearings or bushings 33 for the rotor shaft 34. The rotor 23 itself is formed of a stack of soft iron plates or laminae 35 provided with suitable cut-outs so as to form a number of equally spaced teeth 36 distributed about the periphery of the rotor. In the present instance 8 rotor teeth are provided. Laminae 35 are held together by a number of rivets 37 passing through the rotor assembly.

The stator is formed from a similar stack of soft iron plates or laminae 38 in the form of rings having an even number of inwardly projecting teeth 39 uniformly spaced around the inside of the stator to provide magnetic poles for the various stator windings 40 which are secured thereon. In the present instance 6 stator teeth are provided. The stator laminae 38 are clamped together by a plurality of threaded rods 41 and screw heads 42 which are further secured to circular plates 32 by screws 43, thereby centering the stator between plates 32.

The windings 40 (see Figures 6 and 7) are preferably made up first by winding insulated copper wire of suitable diameter on tubes 44, of such size and shape as to fit snugly over the stator teeth. The tubes 44 are provided with end discs to retain the sides of the coils in position. The tube 44 can be made of fibre composition or the like and one end disc 45 may likewise be formed of the same material. In accordance with one aspect of the present invention, however, it is desirable that the other end disc 46 be made of a conductive metal, suitably copper. This copper ring provides, in effect, a short circuited winding on each stator pole in addition to the energizing winding, and effects a reduction of the sparking at the contactor brushes and also reduces the speed of the motor, both desirable effects for a motor of the kind described. It is also contemplated in the present invention to make either or both of parts 44 and 45 of metal if more pronounced effects are desired.

The rotary contactor 25 (see Fig. 4) is keyed to the end of rotor shaft 34 and held in position by set screw 47. The contactor may be formed of a circular disc of highly conductive metal such as copper provided with a plurality of isulating segments 48 so that the edge of the disc consists of a succession of alternate conducting segments 49 and insulating segments 48. The number of conducting segments corresponds to the number of armature teeth, in the present instance there being 8 of each.

A plurality of brushes 50 of suitable construction are mounted for co-operation with the rotary contactor, the number of brushes needed being equal to half the number of stator teeth. These brushes are distributed about the rotary contactor with such angular spacing as to make and break contact with the conductive contactor segments 49 at predetermined armature positions, as will be later described. The brushes may suitably be formed of bars of carbon or other brush materials of the prior art and may be suitably mounted in guides 51 in brush holders 52. Springs 53 serve to hold brushes 50 against the rotary contactor. The brushes and their holders are insulated from the motor frame by a semicircular strip of insulating sheet material 54 but are connected to the respective field windings 40 by insulated conductors 55. Rotary contactor 25 is grounded directly to the motor frame.

The motor circuits are shown diagrammatically in Figure 8. Starting at one side 56 of the power supply circuit the circuit passes through control switch 27 to the motor frame and the rotary contactor. The circuit then passes through whichever of the brushes are in contact with a conducting contactor segment and a connecting conductor 55 to the winding of one of field coils 40. The field coils 40 are connected together in pairs, preferably in series circuit, the connected coils being in diametrically opposite positions in the motor. The second winding is connected to the opposite side 57 of the power supply circuit.

The windings of each pair of coils are connected in such manner that poles of opposite polarity will be produced.

Due to the diametrically opposite positions of the coils of each pair (and their poles 39) the radial magnetic forces applied to the armature by the poles cancel each other. This contributes to a substantial reduction in bearing wear and vibration, due to the avoidance of any asymmetric magnetic forces tending to shift the rotor axis.

Individual condenser elements may, if desired, be connected between each of the brushes and the rotary contactor so as to provide a capacity across the contacts for arc suppression. These condensers may be used to supplement the effects of copper rings 46 or may be used in place of these rings in some instances, such as for A. C. operation. It is likewise possible to use resistances in place of the condensers, with some lowering of overall efficiency.

The arrangement preferred for A. C. operations is shown diagrammatically in Figure 11. Condensers 75, 76 and 77 are here bridged across the respective brush contacts. It is found that this arrangement, in addition to suppressing the sparking, increases the efficiency on A. C. operation by a considerable amount. The operation of the motor on A. C. is otherwise similar to operation on D. C. In general there will be little or no noticeable synchronism between the motor rotations and the current alternations. It may be, however, that with certain designs some synchronism may be obtained. The arrangements of Figure 11 may likewise be used for D. C. operation.

The gear train 26 (see Figure 2) is driven by pinon gear 58, keyed to rotor shaft 34. Speed-reducing gears 59, 60 and 61 form part of the gear train and serve to reduce the rotary speed to that desired for operation of the windshield wiper arm. Gear 61 drives a gear 62 which in turn drives another gear 63 of equal size. A pair of mutilated gears 64 and 65 are keyed or otherwise secured to the outer faces of gears 62 and 63 respectively and form part of the reciprocating drive arrangement for the wiper shaft. Gears 64 and 65 co-operate in driving a third mutilated gear 66 which is keyed directly to wiper arm drive shaft 28. A positive reciprocating drive with constant speed and torque in both directions is obtained by virtue of the novel design and inter-relationship of gears 62, 63, 64, 65 and 66. This relationship is as follows:

Gears 62 and 63 are preferably of the same size and pitch and preferably larger in pitch diameter than gears 64 and 65. Mutilated gears 64, 65 and 66 should be all of the same pitch. Gears 64 and 65 should have the same pitch diameter and number of teeth.

Mutilated gears 64 and 65 must alternately exert torque on gears 66, each through approximately 180° of the rotation of gear 64 or 65. Where gear 66 is of the same pitch diameter as 64 and 65 it will obviously be rotated first 180° in one direction and then 180° in the other.

The lines of centers from gears 64 and 65 to gear 66 must enclose an angle approaching an integral number of full pitch angles of gear 66. A full pitch angle is the central angle between corresponding points on two adjacent teeth. This relationship assures complete control of the driven gear 66 at all times. As soon as one of the mutilated gears relinquishes control at the end of a stroke the other mutilated gear is in the correct position to properly mesh with gear 66 for the return stroke.

Gear 66 may be larger or smaller than gears 64 and 65 depending upon the angle of rotation desired in the reciprocating wiper shaft. With gear 66 larger than the others the angle of rotation of the reciprocating shaft will be less than 180°. It may be necessary to file down the end or "contacting" teeth in some cases to obtain adequate tooth clearance at the ends of the stroke when one of driving gears 64 and 65 becomes unmeshed from gear 66 and the other driving gear comes into contact with gear 66.

It will be appreciated that in the embodiment shown the gears have been adapted to the limited space available within the motor case. It is obvious that the size and relative location of the gears could be changed, without departing from the present invention.

For the embodiment illustrated the gears may suitably be made with the following numerical values:

Gears 62 and 63:—
  Pitch diameter: preferably ¾″
  Diametral pitch: 24, 32 or 48
  Teeth: 24 or more Gears 64 and 65:—
  Pitch diameter: $\frac{7}{12}''$
  Diametral pitch: 24
  Teeth: 14 tooth gears with 8 removed leaving 6 teeth Gear 66:—
  Pitch diameter: $\frac{7}{12}''$
  Diametral pitch: 24
  Teeth: 14 tooth gear with 4 removed leaving 10 teeth Angle between center lines from gears 64 and 65 to gear 66=approximately 3 tooth segments.

Control switch 27 (see Figure 2) provides for switching the motor on and off and cooperates with a cam 67 on gear 65 for stopping the wiper arm at a predetermined position, such as at the end of the wiping stroke. Switch 27 comprises a block 68 mounted near one of its ends on a pivot 69 secured to plate 32, and a pair of suitably bent contact springs 70 and 71 riveted to the two opposite edges of block 68 and extending beyond the free end thereof. The switch is arranged to be operated by a manual control arm 72 (Figure 1) on the outside of the motor cover plate 22. Arm 72 controls an eccentric shaft 73 inside cover plate 22, block 68 being provided with a slot 74 for receiving said eccentric shaft.

When cam 67 is in the position shown in Figure 2, corresponding approximately to the end of a stroke of the wiper arm, and the switch arm 72 is in such a position that the eccentric shaft 73 is as shown in this figure the switch will be held open by the cam. It can be seen that the high point of cam 67 holds contact spring 70 away from the end of contact spring 71.

Upon operation of switch arm 72 so as to rotate eccentric shaft 73 the switch as a whole is turned outward so that contact spring 70 ceases to press against cam 67. Contacts 70, 71 are thereby allowed to close. The motor will thereby be started, the gear train driving wiper shaft 28 and arm 30 in an oscillatory manner. The gears at one end of the stroke are in substantially the position shown in Figure 2 and at the other end are all rotated substantially 180°.

When it is desired to stop the motor the switch arm 72 is operated to rotate eccentric shaft 73 into the position shown in Figure 2. This operation brings the end of contact spring 70 into the path of movement of the high point of cam 67. The rotation continues, however, until cam 67 reaches the position shown in Figure 2 whereupon the contacts are opened by the cam and the motor is stopped when the wiper arm 30 is at the end of its stroke.

In the diagrammatic illustrations of the motor in Figures 8, 9 and 10 the preferred relationships of rotor teeth, stator poles, contactor segments and brushes for obtaining continuous and substantially uniform torque are shown at various stages in the rotation of the motor. In order to obtain a substantially uniform torque the rotor teeth and the spaces between the rotor teeth are preferably equal in angular width at the periphery of the rotor and the width of each is accordingly $$\frac{360°}{2N}$$

where N is the number of rotor teeth. Hence with the 8 tooth rotor illustrated each rotor tooth is 22½° wide and each space between teeth is 22½° wide.

The width of the stator teeth (or poles) is preferably equal to that of the rotor teeth. There must be at least three stator poles and since the poles are most effective if operated in pairs as north and south poles it is preferred that there be at least three pairs of poles. If a "pole unit" is defined as that pole or group of poles which is always energized as a unit then it may be stated that there must be at least three stator pole units. In the arrangement shown three pairs of diametrically opposite poles are provided. The number of contact brushes will normally equal the number of pole units.

In order for the motor to operate with the best efficiency and with continuous torque in one direction for all positions of the rotor each unit of stator pole windings 40 should not be energized until rotor teeth have at least partly covered the respective stator poles of that unit and should be de-energized before said rotor teeth have reached a point fully covering the stator poles. Accordingly each stator pole should be energized during rotation of the rotor through an angle less than the width of a rotor tooth, i. e. less than $$\frac{360°}{2N}$$

In order to insure a cintinuous unidirectional torque for all positions there must be at least a slight overlap period during which two units are energized. In order to have an overlap period each stator pole unit must be energized during a rotation greater than the combined width of a rotor tooth and rotor space divided by the number of pole units, i. e., greater than $$\frac{360°}{Nn}$$

where $n$ equals the number of pole units. Each pole unit will then be energized for a sufficient period to overlap with the energization of the next pole unit. The angular pull per pole should accordingly fall between $$\frac{360°}{Nn}$$

and $$\frac{360°}{2N}$$

where N=number of rotor teeth and $n$=number of pole units.

Applying the above requirements to the motor shown in the drawings the stator pole should be energized during rotation of the rotor through an angle less than 22½° and greater than 15°. The marginal values, namely 15° and 22½°, are not included in the range of preferred operative values.

The stator poles must likewise be appropriately spaced about the rotor in order that they may exert a magnetic pull upon successive rotor teeth at the proper time. If "displacement" is defined as the angular spacing in the direction of rotation between a first stator pole and the next stator pole to be energized (although not necessarily the pole in the next adjacent position in the stator) then $$\text{Displacment } D = K \times \frac{360°}{N} + \frac{360°}{Nn}$$

where K is an integer.

For the motor illustrated $$D = 1 \times \frac{360°}{8} + \frac{360°}{8 \times 3} = 45 + 15 = 60°$$

In other words pole 39c, which is energized next after pole 39a, is spaced 60° around the stator from pole 39a.

It will be apparent that the number of operating cycles for the contactor during one revolution will equal the number of rotor teeth. Furthermore the combined width of any conductive contactor segment and brush shall be such that the associated stator windings will be energized through the desired angle of rotation. Accordingly, the combined angular width of a brush and a contactor segment should be between $$\frac{360°}{Nn}$$

and $$\frac{360°}{2N}$$

The relationships, therefore, in the general case, are as follows:

Rotor teeth are evenly spaced around the rotor.

Width of rotor teeth W = width of rotor spaces =

$$\frac{360°}{2N}$$

Width of stator poles = width of rotor teeth =

$$\frac{360°}{2N}$$

Number of stator pole units $n = 3$ or more (preferably 3 or more pairs of poles).

Angular rotation during energization of any pole = combined width of brush and contactor segment = between $$\frac{360°}{Nn}$$

and $$\frac{360°}{2N}$$

Displacement $$D = K \times \frac{360°}{N} + \frac{360°}{Nn}$$

In the motor illustrated the relationships are:
$W = 22½°$
$N = 8$
$n = 3$ (pairs)

Rotation during energization of any pole = between 15° and 22½° (preferably approximately 20°).

$$D = 60°$$

Referring to the different rotor positions shown in Figures 8, 9, and 10 it will be noted that in Figure 8 the pair of poles 39a and 39b are just being energized and that rotor teeth 36a and 36b have just started to cover these poles. Also poles 39e and 39f are still energized but will be de-energized after a further rotation of about 5°.

In Figure 9 the rotor has turned about 15° past the position shown in Figure 8. Poles 39a and 39b are still energized and rotor teeth 36a and 36b have reached a position about 17½° coupled with the poles. Rotor teeth 36c and 36d have just started to cover poles 39c and 39d and these poles are just being energized.

In Figure 10 the rotor has turned about 5° further. The teeth 36a and 36b are now fully coupled with poles 39a and 39b and the poles are just being deenergized.

Thus it will be seen that each pair of poles is energized through an angle of rotation of about 20° and that there is an overlap period of 5° during which two pairs of poles are energized.

The above relationships contribute to produce characteristics in the motor which render it very suitable for many uses, such as windshield wiper operation. The close spacing of the rotor teeth, together with the arrangement of the poles provides for a torque of substantially uniform value throughout an operating cycle instead of a variable torque with points of very low value or zero value during the cycle as found in impulse-type motors of the prior art. These prior art motors are very susceptible to stalling at these points of low torque. The motor can be made in many different sizes and the characteristics can be varied for the application desired. The motor can also be arranged for rotation in either direction, it being necessary only to shift the position of the brushes to obtain the proper relationship for rotation in either direction. Likewise the motor can be adapted for either D. C. or A. C. operation.

While the characteristics may be considerably varied by variations in design and proportion the power and torque curves will have the general shape shown in Figure 12 where these two characteristics for a 6 volt motor of the present invention are compared with the same characteristics of a 6 volt series motor. It will be noted that the present motor has a very high starting torque as compared with a series motor and also that the torque at the speed where maximum power is developed is much higher than for a series motor. It should also be noted that maximum power is developed at a considerably slower speed than for a series motor. This is advantageous for windshield wiper operation. The speed can, of course, be regulated somewhat by the size of the short-circuiting discs 46 and other design factors. The short-circuiting discs 46 also contribute to the steepness of the torque curve.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A continuous torque impulse-type electric motor comprising a stator and a rotor, said stator having at least three pole units distributed about said rotor, magnetizing windings for said pole units, said rotor having a plurality of teeth of magnetically permeable material uniformly distributed about its periphery, the angular width of the teeth being substantially equal to the angular width of the spaces between the teeth, and contactor means arranged so as to supply electric current successively to the windings for successive pole units, said contactor means supplying current to each pole unit during rotation of the rotor through an angle greater than $$\frac{360°}{Nn}$$

and less than $$\frac{360°}{2N}$$

where N is the number of rotor teeth and $n$ is the number of stator pole units.

2. A continuous torque impulse-type electric motor comprising a stator and a rotor, said stator having at least three pairs of poles distributed about said rotor, magnetizing windings for said poles, said rotor having a plurality of pairs of teeth of magnetically permeable material uniformly distributed about its periphery, the angular width of the teeth being substantially equal to the angular width of the spaces between the teeth, and a contactor means arranged so as to supply electric current successively to the windings of successive pairs of poles, said contactor means supplying current to each pair of poles during rotation of the rotor through an angle greater than $$\frac{360°}{Nn}$$

and less than $$\frac{360°}{2N}$$

where N is the number of rotor teeth and $n$ is the number of pairs of stator poles.

3. A continuous torque impulse-type electric motor comprising a stator and a rotor, said stator having three pairs of poles distributed about said rotor, magnetizing windings for said poles, said rotor having four pairs of teeth of magnetically permeable material uniformly distributed about its periphery, the angular width of the teeth being substantially equal to the angular width of the spaces between the teeth, and a contactor device arranged so as to supply electric current successively to the windings of successive pairs of poles, said contactor means supplying current to each pair of poles during rotation of the rotor through an angle greater than 15° and less than 22½°.

4. A continuous torque impulse-type electric motor comprising a stator and a rotor, said stator having at least three pole units distributed about said rotor, magnetizing windings for said pole units, said rotor having a plurality of teeth of magnetically permeable material uniformly distributed about its periphery, the angular width of the teeth being substantially equal to the angular width of the spaces between the teeth, and a contactor device for successively energizing the windings for successive stator pole units, the angular spacing in the direction of rotation between sucessive stator poles to be magnetized being substantially equal to $$K\frac{360°}{N}+\frac{360°}{Nn}$$

where K is an integer, N equals the number of rotor teeth and $n$ equals the number of stator pole units.

5. A continuous torque impulse-type electric motor comprising a stator and a rotor, said stator having at least three pairs of poles distributed about said rotor, magnetizing windings for said poles, said rotor having a plurality of pairs of teeth of magnetically permeable material uniformly distributed about its periphery, the angular width of the teeth being substantially equal to the angular width of the spaces between the teeth, and a contactor device for successively energizing the windings for successive pairs of stator poles, the angular spacing in the direction of rotation between successive stator poles to be magnetized being substantially equal to $$K\frac{360°}{N}+\frac{360°}{Nn}$$

where K is an integer, N equals the number of rotor teeth and $n$ equals the number of pairs of stator poles.

6. A continuous torque impulse-type electric motor comprising a stator and a rotor, said stator having three pairs of poles distributed about said rotor, magnetizing windings for said poles, said rotor having four pairs of teeth of magnetically permeable material uniformly distributed about its periphery, the angular width of the teeth being substantially equal to the angular width of the spaces between the teeth, and a contactor device for successively energizing the windings for successive pairs of stator poles, the angular spacing in the direction of rotation between successive stator poles to be magnetized being substantially equal to 60°.

7. A continuous torque impulse-type electric motor comprising a stator and a rotor, said stator having at least three pole units distributed about said rotor, magnetizing windings for said pole units, said rotor having a plurality of teeth of magnetically permeable material uniformly distributed about its periphery, the angular width of the teeth being substantially equal to the angular width of the spaces between the teeth, and a rotary contactor device arranged so as to rotate with said rotor, said device comprising a circular series of alternate conducting and insulating segments, a brush individual to each of said pole units and arranged to make sliding contact with successive contactor segments during rotation of said contactor, the combined angular width of one of said brushes and one of said conducting contactor segments being greater than $$\frac{360°}{Nn}$$

and less than $$\frac{360°}{2N}$$

where N is the number of rotor teeth and $n$ is the number of stator pole units.

8. A continuous torque impulse-type electric motor comprising a stator and a rotor, said stator having at least three pairs of poles distributed about said rotor, magnetizing windings for said poles, said rotor having a plurality of pairs of teeth of magnetically permeable material uniformly distributed about its periphery, the angular width of the teeth being substantially equal to the angular width of the spaces between the teeth, and a rotary contactor device arranged so as to rotate with said rotor, said device comprising a circular series of alternate conducting and insulating segments, a brush individual to each of said pairs of poles and arranged to make sliding contact with successive contactor segments during rotation of said contactor, the combined angular width of one of said brushes and one of said conducting contactor segments being greater than $$\frac{360°}{Nn}$$

and less than $$\frac{360°}{2N}$$

where N is the number of rotor teeth and $n$ is the number of pairs of stator poles.

9. A continuous torque impulse-type electric motor comprising a stator and a rotor, said stator having three pairs of poles distributed about said rotor, magnetizing windings for said poles, said rotor having four pairs of teeth of magnetically permeable material uniformly distributed about its periphery, the angular width of the teeth being substantially equal to the angular width of the spaces between the teeth, and a rotary contactor device arranged so as to rotate with said rotor, said device comprising a circular series of alternate conducting and insulating segments, a brush individual to each of said pairs of poles and arranged to make sliding contact with successive contactor segments during rotation of said contactor, the combined angular width of one of said brushes and one of said conducting contactor segments being greater than 15° and less than 22½°.

10. A continuous and substantially uniform torque impulse-type electric motor having a toothed iron rotor, an iron stator comprising three diametrically located pairs of electromagnet poles, and contacting means for energizing the pairs of poles successively, said rotor having teeth of angular width approximately equal to the angular width of the recesses between the teeth and of a number incommensurable with the number of pairs of stator poles, said stator poles having pole faces of approximately the same angular width as the rotor teeth disposed in close proximity to the rotor teeth and in such positions about the rotor that when one stator pole is directly opposite a rotor tooth other stator pole faces are partially opposed to other rotor teeth but are displaced from direct opposition thereto by equal angular distances and in opposite directions, said contacting means comprising a grounded rotating segmented conductor having the same number of conductive segments as the rotor has teeth and moving with the rotor, and three conducting brushes cooperating therewith, one connected with each pair of electromagnet coils, the combined angular width of one contactor segment and one brush being greater than one-third the angular width of one rotor tooth and one rotor space and less than one-half the angular width of one rotor tooth and one space, the disposition of the brushes about the contactor being such that the respective pairs of electromagnet poles are successively energized at the same predetermined position of each rotor tooth in relation thereto.

11. A continuous torque impulse-type electric motor comprising a stator and a rotor, said stator having at least three pairs of poles distributed about said rotor, a plurality of pairs of rotor teeth of magnetically permeable material uniformly distributed around the periphery of said rotor, the angular width of the teeth being substantially equal to the angular width of the spaces between the teeth, energizing windings for said stator poles and circuit connections arranged so as to energize said windings to magnetize said stator pole pairs at opposite polarity whereby an energized pair of stator poles will attract a pair of rotor teeth, the poles of each pair being in diametrically opposite positions on said stator and the teeth of each rotor teeth pair being in diametrically opposite positions on said rotor whereby asymmetric magnetic forces tending to displace the rotor axis are avoided.

12. An electric impulse-type motor comprising a rotor having a plurality of teeth of magnetically permeable material spaced around its periphery, a stator having a plurality of poles distributed around said rotor, each of said poles having a magnetizing coil and a core of magnetically permeable material within said coil, contactor means for periodically energizing each of said coils and inductive means associated with each of said poles arranged so as to absorb energy from the associated coil upon deenergization of said coil.

13. An electric impulse-type motor comprising a rotor having a plurality of teeth of magnetically permeable material spaced around its periphery, a stator having a plurality of poles distributed around said rotor, each of said poles having a magnetizing coil and a core of magnetically permeable material within said coil, contactor means for periodically energizing each of said coils and capacitative means associated with each of said poles arranged so as to absorb energy from the associated coil upon deenergization of said coil.

14. An electric impulse-type motor comprising a rotor having a plurality of teeth of magnetically permeable material spaced around its periphery, a stator having a plurality of poles distributed around said rotor, each of said poles having a magnetizing coil and a core of magnetically permeable material within said coil, contactor means for periodically energizing each of said coils and a short-circuited winding around each of said cores for inductively absorbing energy upon deenergization of the associated coil.

15. An electric impulse-type motor comprising a rotor having a plurality of teeth of magnetically permeable material spaced around its periphery, a stator having a plurality of poles distributed around said rotor, each of said poles having a magnetizing coil and a core of magnetically permeable material within said coil, contactor means for periodically energizing each of said coils and a short-circuited winding around each of said cores for inductively absorbing energy upon deenergization of the associated coil, said winding comprising a metal disc arranged as an end piece for said coil.

SAMUEL RUBEN.